United States Patent [19]

Goff, Jr. et al.

[11] Patent Number: 4,533,921

[45] Date of Patent: Aug. 6, 1985

[54] ELECTROEROSION PRINTHEAD WITH TUNGSTEN ELECTRODES, AND A METHOD FOR MAKING SAME

[75] Inventors: Willie Goff, Jr., Austin; James M. Rakes, Leander, both of Tex.

[73] Assignee: International Business Machines Corporation, Armonk, N.Y.

[21] Appl. No.: 567,703

[22] Filed: Jan. 3, 1984

[51] Int. Cl.³ ........................ G01D 9/00; G01D 15/16

[52] U.S. Cl. .................................. 346/1.1; 346/139 C

[58] Field of Search .......... 346/139 C, 139 R, 76 PH, 346/1.1; 400/120; 219/216 PH; 174/126 CP; 428/674, 663; 252/512

[56] References Cited

U.S. PATENT DOCUMENTS

| | | | |
|---|---|---|---|
| 1,405,534 | 2/1922 | Merritt | 174/126 CP |
| 3,624,661 | 11/1971 | Shebanon | 346/139 C |
| 3,644,931 | 2/1972 | Stringer | 346/74 |
| 3,718,936 | 2/1973 | Rice | 346/74 |
| 3,968,500 | 7/1976 | Meisel | 346/139 |
| 4,082,619 | 4/1978 | Dehnert | 346/139 C |
| 4,151,535 | 4/1979 | Uberbacher | 346/139 |
| 4,157,554 | 6/1979 | Bahr | 346/163 |
| 4,162,503 | 7/1979 | Potma | 346/163 |
| 4,189,736 | 2/1980 | DeFilipps | 346/139 C |
| 4,287,525 | 9/1981 | Tagawa | 346/155 |

OTHER PUBLICATIONS

IBM Technical Disclosure Bulletin, vol. 20, No. 10, March 1978, p. 3924, "Laminated, Ceramic Electro-Erosion Printhead", J. N. Humenik et al.

*Primary Examiner*—Thomas H. Tarcza
*Assistant Examiner*—Mark Reinehart
*Attorney, Agent, or Firm*—John L. Jackson

[57] ABSTRACT

The print wires 4 of an electroerosion printhead 1 are retained in grooves 3 of a substrate 2. These wires 4 are fixed to the substrate and covered by a copper layer 6. The copper layer is machined to provide a smooth surface on the copper and between the copper in the grooves and the surface of the substrate. Contact pads 7 are formed on or applied to the strip-like copper layers 6 to fan out the contact areas for suitable accessibility for attaching control cables 17.

10 Claims, 9 Drawing Figures

ELECTROEROSION PRINTHEAD WITH TUNGSTEN ELECTRODES, AND A METHOD FOR MAKING SAME

TECHNICAL FIELD

The present invention relates to an electroerosion printhead having tungsten electrodes and a method of manufacturing the printheads.

BACKGROUND ART

In the *IBM Technical Disclosure Bulletin,* Vol. 20, No. 10, Mar. 1978, pages 3924–3926 there is described an electroerosion printhead that contains two staggered rows of tungsten electrodes which are encapsulated in ceramic material. This ceramic material substrate which carries the electrodes is made from laminated green or unsintered sheets on which the electrodes are first registered and which then afterwards are sintered under application of heat and pressure.

U.S. Pat. No. 4,151,535 discloses an electroerosion printhead formed from a plurality of laminated sheets which are electrically conductive, each sheet having an electrode forming protrusion on one edge and a tap forming protrusion on the opposite edge for tap fanout.

U.S. Pat. No. 3,968,500 describes an electrode printhead that has a plurality of strip shaped chromium-nickel steel alloy electrodes. The individual electrodes are etched or stamped out from two sheet metal parts. The electrodes are juxtapositioned for assembly in a mirror-like fashion in a single row whereby electrodes of both metal parts intermesh. During assembly insulating material is inserted between the electrodes. Due to the mirror-like assembly the rear contact ends of the electrodes are located in two planes, thus facilitating electrical connections. High resolution printing cannot be achieved with the printhead.

U.S. Pat. No. 3,644,931 discloses an oscillating page-wide, electroerosion printhead which has an array of a plurality of tungsten styli arranged in a single row.

In none of the above cited prior art is there shown an electrode wire for an electroerosion printhead which is covered with a copper or a copper alloy layer which functions as a connector pad or on which a connector pad might be formed.

DISCLOSURE OF INVENTION

The main object of the present invention is to provide an electroerosion printhead and method of manufacturing the printhead. The method of manufacturing the printhead greatly simplifies the manufacturing process and thus provides a relatively low cost, high resolution printhead which can be easily and readily cable connected to the printhead electrical control means.

The printhead body or substrate is made of a plastic material molded with grooves which will carry the tungsten electrodes. The tungsten electrodes are formed from a solid sheet of tungsten which is selectively etched to provide a pattern of electrodes corresponding to the molded grooves of the substrate. For handling and support the tungsten adjacent each extremity of the electrodes is nonetched. The electrode pattern is then positioned on the substrate with each electrode positioned in its corresponding groove. The electrodes are secured to the body and in the grooves by attaching a holding member to the substrate which applies pressure to the electrodes adjacent their ends where printing will take place. The remainder of the electrodes is then plated with copper to cover the electrodes and fill the grooves in the substrate.

The excess tungsten is then removed from the ends of the electrodes to electrically isolate them and to provide a smooth printing face and then any excess copper between the tungsten strips is machined or etched off to provide electrical isolation between the tungsten strips and to create a common plane for the copper in the grooves and the substrate surface. Leads can be attached directly to the copper areas or contact pads can be formed. This is done by using conventional printed circuit techniques. The leads can be attached as is well known in the art in a staggered fashion to provide several planes of contact areas to facilitate construction of a high print density head.

BRIEF DESCRIPTION OF DRAWING

In the following, the invention will be described in detail in connection with the accompanying drawing that shows different embodiments of the invention. In the drawing.

BEST MODE FOR CARRYING OUT THE INVENTION

Figure 1:
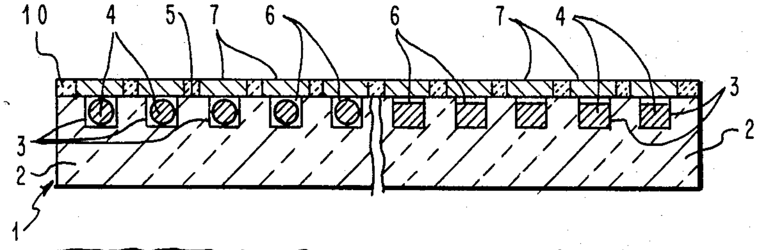
FIG. 1 is a cross section that shows electrode wires of two different shapes embedded in a flat substate and covered by copper pads.
Figure 2:
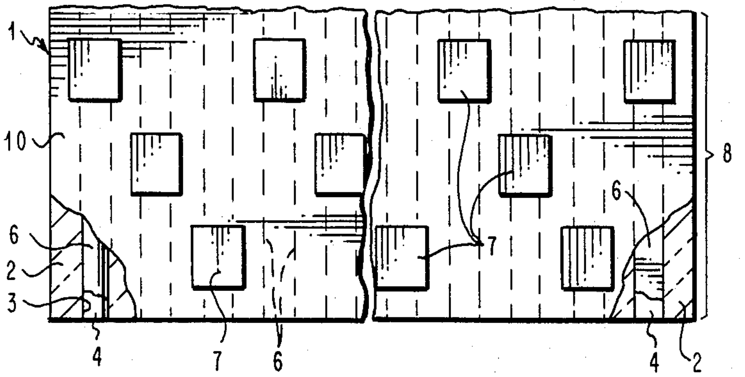
FIG. 2 is a top view of the arrangement shown in FIG. 1 that shows the connection pads of adjacent electrode wires in staggered configuration which form part of a printhead.

FIG. 1 and 2 depict schematically in a cross section and a top view the contact print or area of an electroerosion printhead 1. A substrate 2 made from a suitable material is provided with locating grooves 3. As material, a plastic may be used which may be molded with 3 deep enough so that a wire electrode 4 lies below the surface 5 of substrate 2.

The wires 4 are preferably made out of tungsten and serve as print electrodes in the electroerosion printhead. They may have a cylindrical cross sectional shape as shown in the left-hand side of FIG. 1 or they may have a rectangular shape as shown in the right-hand side of FIG. 1. Grooves 3 as shown have rectangular shape, but could have different shapes, for example, they could have a V-like form.

On top of wires 4 a layer 6 of copper or copper alloy is plated which entirely covers them and fills grooves 3 completely. It is extremely difficult to make an electrical soldered connection with tungsten. This complete surrounding of the electrodes with copper greatly enhances the electrical conducting between the copper and tungsten thus alleviating the normal difficulty encountered when attaching a lead to a tungsten electrode. This layer 6 forms a strip as illustrated by the dashed lines in FIG. 2. Layers extend parallel to the longitudinal axis of wires 4. The outer surface of layer 6 preferably lies in the same plane as surface 5 of substrate 2. Layers 6 serve to fix the wires 4 in their associated grooves 3 and form connectors.

Layer 6 may form the contact for leads, not shown, of a cable means such that control means, not shown, are able to power the electrode wires 4. Each layer 6, on the other hand, may form a nucleus for making larger contact pads 7 by using well known printed circuit technology for providing these pads 7 on top of layer 6 in the contact area 8 adjacent the printing tips created when 13 is machined. The contact pads 7 shown in FIG. 2 are arranged in three staggered rows to fan them out for more space when soldering leads to them. As illustrated, pads 7 contact layer 6 through windows provided in an insulating layer 10 overlying the contact area 8 as shown in FIGS. 1 and 2. Pads 7 extend over the width of layer 6 as FIG. 1 shows.

Figure 3:
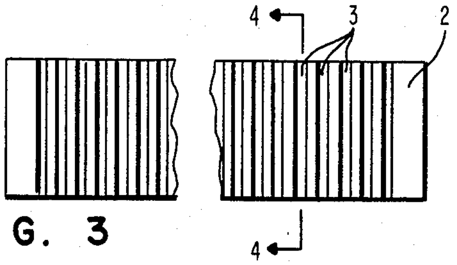
FIG. 3 is a top view of a flat substrate that is provided with grooves for accepting electrodes.
Figure 4:
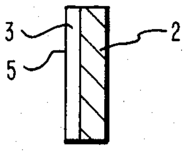
FIG. 4 is a cross section along line 4—4 of FIG. 3.
Figure 5:
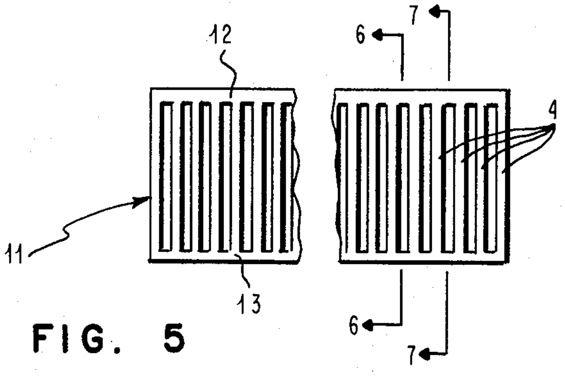
FIG. 5 is a top view of an etched thin tungsten sheet that comprises alternately webs and openings, and that fits with its long webs into the grooves of the substrate shown in FIG. 3.
Figure 6:
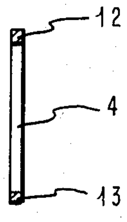
FIG. 6 is a cross section along line 6—6 of FIG. 5, showing a cross section of the etched tungsten sheet.
Figure 7:
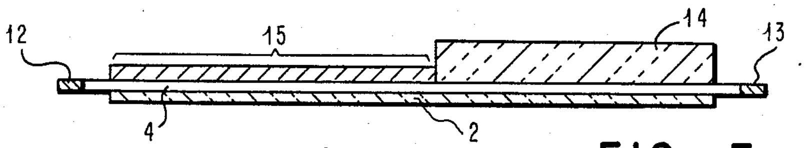
FIG. 7 is a cross section along line 7—7 of FIG. 5 showing the arrangement of the etched tungsten sheet superimposed on the substrate, together with a holding member.

Especially with reference to FIGS. 3–7 the essential steps for producing a printhead in accordance with the invention will now be described. FIGS. 3 and 4 show schematically substrate 2 with a series of discrete, parallel arranged and equally distanced grooves 3. FIG. 5 depicts schematically a thin sheet 11 made of tungsten that contains webs 4 suspended between end members 12 and 13. The sheet 11 is etched so that the webs 4 have the desired shape and dimensions. Here the shape would be preferably rectangular as shown in the right-hand portion of FIG. 1.

Sheet 11 is placed on substrate 2 in such a way that webs 4 fit into grooves 3. It should be noted that it is possible to place in these grooves 3 discrete wires 4 that have a circular cross section as shown in the left side of FIG. 1. Wires or webs 4 placed in grooves 3 of substrate 2 are held in place by a holding member 14. This member may be cemented to the substrate. Area 15 is now electroplated with copper or copper alloy so that wires 4 are covered and grooves 3 are filled with copper or copper alloy slightly higher than surface 5 of substrate 2. Then in area 15 the covering copper is machined or etched off such that the already described strip-like copper layers 6 are generated which are separated by substrate material. After that the end members 12 and 13, are removed to create wires 4 in order to form the printing tips and provide electrical isolation of the electrodes.

Figure 8:
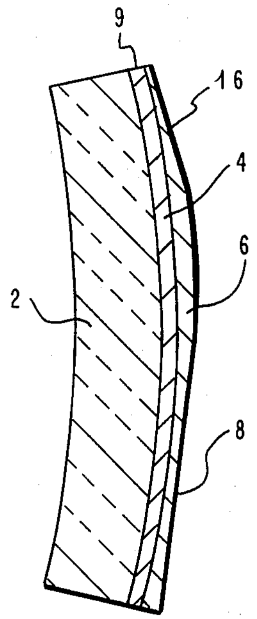
FIG. 8 shows a cross section of a cylindrically shaped substrate which is provided with tungsten electrodes covered by copper layers for providing contact pads and which is made flat in the printing and contact area.
Figure 9:
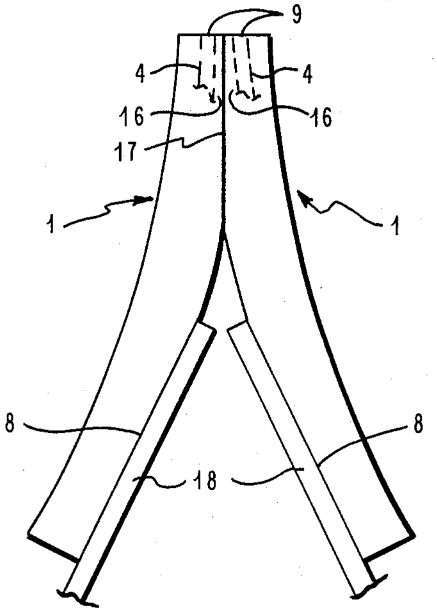
FIG. 9 shows schematically the back-to-back arrangement of two curved substrates containing print wires to form an electroerosion head of doubled resolution, and also depicts where the cable means are attached to the printhead.

The example shown in FIG. 1–7 provides a flat substrate 2. FIG. 8 shows in cross section a cylindrically curved substrate 2 along with a wire 4 covered by a copper layer 6. To positively retain the copper coated wires 4 in their grooves of that curved substrate, the cross section of these grooves is wider at the bottom than at the top, e.g., it is shaped dovetail like. Adjacent to the print tip area 9 there is provided a flat area 16. This flat area 16 simplifies the assemblying of another head 1 to form an arrangement schematically shown in FIG. 9 wherein a thin insulating layer 17 electrically isolates 1. Such an arrangement provides a doubled print resolution if the parts are staggered, as is well known, by half the distance between two adjacent wires 4. The opposite end contains the contact area 8 which is flat as shown in FIG. 8. This flattening can be accomplished by machining. In this flattened contact area 8 the pads 7, as shown in FIG. 2, are formed. To those pads 7 individual leads of cable means 18 may be fixed, for example, by heated bar soldering. As can be seen from FIG. 9 the curved configuration of substrate 2 provides space for the cable connection between the two heads 1 and which facilitates positioning print wires 4 of these two heads very close together in flattened areas 16 to provide high resolution.

Printhead 1 may well be designed to span the entire width of a page to be printed. The distance between grooves 3 might, for instance, be 10 mils and the diameter of the cylindrical wire be 5 or 6 mils. The cross section of the rectangular wires might be 5 or 6 mils by 5 or 6 mils. A head 1 with these design values has a resolution of 100 pel. If they are assembled in staggered fashion by half a wire spacing, resolution is doubled to provide a 200 pel electroerosion printhead.

The pads 7 shown in FIG. 2 may, for instance, be 8 mils in width and 100 mils in length along the direction of the wire extension. The actual dimensions will be dependent on the cable and the soldering technique used.

In making the pads 7 by well known printed circuit techniques, the following photo aided process may be applied.

Insulating layer 10 is formed by fusing a dry film photoresist material to both the substrate 2 and the strip-like layers 6. In order to open windows in the insulation layer to form contact pads 7, the pad 7 areas are masked and the photoresist material is exposed to UV light. The development process removes the unexposed photoresist material thereby exposing areas of bare copper pads 6. The exposed copper pad areas are then plated with tin-lead to form the contact pads 7.

While this invention has been particularly shown and described with reference to preferred embodiments thereof, it will be understood by those skilled in the art that the foregoing and other changes in form and details may be made therein without departing from the spirit and scope of the invention.

We claim:

1. An electroerosion printhead having at least one row of equally spaced tungsten wire electrodes fixed in a carrying substrate characterized in that a. each of said electrodes (4) in a contact area (8) spaced from the print tip (9) has its periphery completely covered with a copper layer (6),
b. each of said covering layers is electrically isolated from the layers of adjacent electrodes, and
c. each of said covering layers lies in a common surface (5) with other covering layers and forms a connector surface that extends essentially parallel to the longitudinal axis of said electrode.

2. The printhead of claim 1, further wherein said wire electrodes are fixed in discrete grooves (3) of said substrate with said covering layer of copper at the contact area of each of said electrodes filling said grooves provided in said substrate.

3. The printhead of claim 2 wherein said substrate is made of a moldable material.

4. The printhead of claim 3 further wherein said substrate is flat.

5. The printhead of claim 3 wherein said substrate is of cylindrically curved shape.

6. The printhead of claim 5 further wherein said contact area (8) in which said contact pads (7) are provided is made flat.

7. The printhead of claim 6 further wherein an area (16) adjacent to said print tip end (9) is made flat.

8. The printhead of claim 7 further wherein a second printhead is attached mirror like in said flat area (16) adjacent to said print tip area (9).

9. The printhead of claim 8 further wherein said two printheads (1) are staggered with respect to each other for a distance equal to one-half the distance between two adjacent electrodes (4) whereby a combined printhead with doubled print resolution is provided.

10. A method of providing an electroerosion printhead that contains at least one row of electrodes fixed in a carrying substrate, in which said electrodes are made from thin tungsten wires, including the steps of:

a. forming a series of grooves (3) in said substrate 2,
b. placing said electrode wires (4) in said grooves such that they do not protrude over the surface (5) of said substrate,
c. filling said grooves and covering said wires and substrate with a copper or copper alloy layer at a contact area,
d. removing said copper layer completely from the surface of said substrate such that strips of copper remain over said electrode wires and said strips are electrically isolated from each other by the strip-like material of said substrate, and
e. forming enlarged contact pads (7) on said copper stripes through use of a printed circuit technique.

* * * * *